United States Patent [19]

Paige

[11] 3,984,331

[45] Oct. 5, 1976

[54] LIQUID-LIQUID SETTLER USED IN SOLVENT EXTRACTION APPARATUS

[75] Inventor: Peter M. Paige, Placentia, Calif.

[73] Assignee: Holmes & Narver, Inc., Anaheim, Calif.

[22] Filed: Sept. 9, 1974

[21] Appl. No.: 504,197

[52] U.S. Cl. .............................................. 210/537
[51] Int. Cl.² ......................................... B01D 21/10
[58] Field of Search .............................. 210/21, 537

[56] References Cited
UNITED STATES PATENTS

| | | | |
|---|---|---|---|
| 825,807 | 7/1906 | Clarke | 210/537 |
| 1,985,591 | 12/1934 | Welsh | 210/21 |
| 2,009,510 | 7/1935 | Mobley | 210/21 X |
| 2,361,780 | 10/1944 | Lewis | 210/21 X |
| 3,247,103 | 4/1966 | Shang | 210/21 |
| 3,526,585 | 9/1970 | Camp | 210/21 X |
| 3,666,108 | 5/1972 | Veld | 210/537 X |

*Primary Examiner*—Frank A. Spear, Jr.
*Attorney, Agent, or Firm*—Christie, Parker & Hale

[57] ABSTRACT

A mixture of a first liquid of one density and a second liquid of a different density and which is substantially insoluble in the first liquid is separated by flowing the mixture through a gravity settler tank where the mixture separates into a clear upper layer of the lighter liquid, a clear lower layer of the heavier liquid, and an intermediate layer of uncoalesced droplets of one of the liquids dispersed in a continuous phase of the other at the interface between the upper and lower layers. Clear liquid from the upper layer is withdrawn through an overflow, and clear liquid from the lower layer is withdrawn through an underflow. An impediment or baffle extends across the settler tank transversely to the direction of liquid flow, and is disposed in the intermediate layer of the mixture of the two liquids to impede the flow of the intermediate layer away from the tank inlet.

19 Claims, 3 Drawing Figures

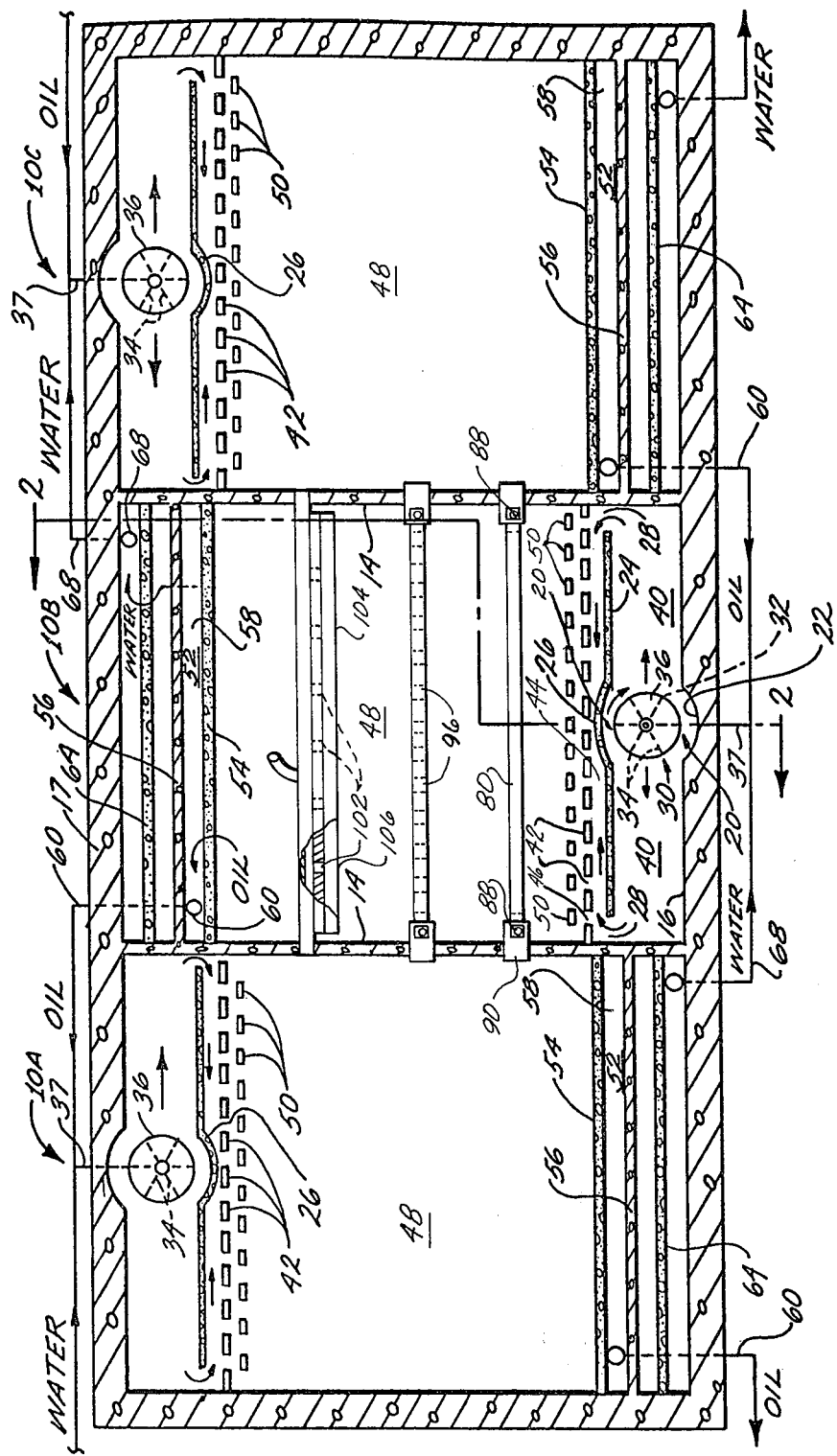
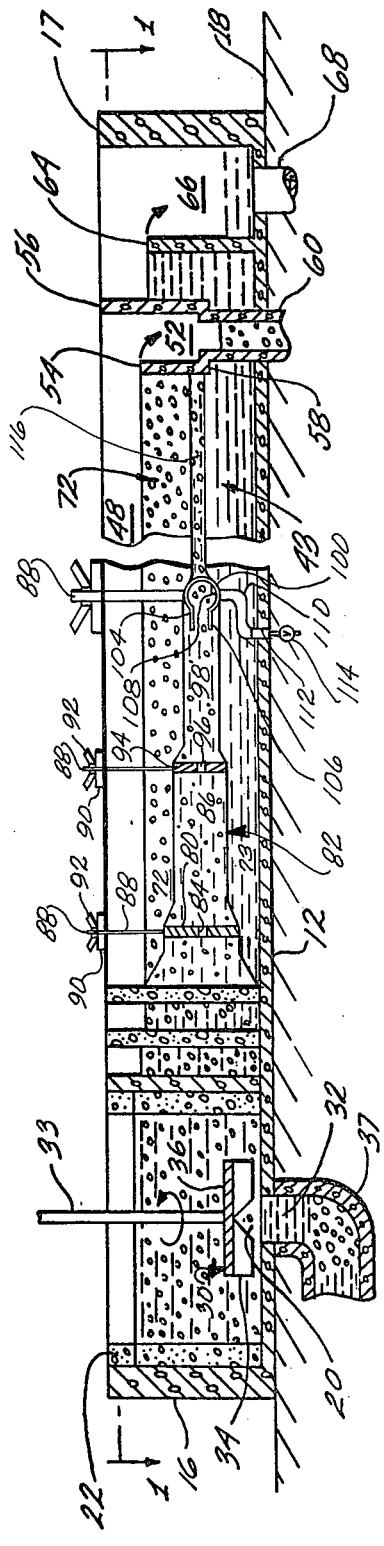
Fig. 1
Fig. 2

LIQUID-LIQUID SETTLER USED IN SOLVENT EXTRACTION APPARATUS

BACKGROUND OF THE INVENTION

1. Field of the Invention

This invention relates to equipment and methods for separating a mixture of two liquids which are substantially mutually isoluble. If one or both of the liquids contain suspended solids, the solids can be removed or concentrated with the apparatus and method of the invention.

2. Description of the Prior Art

Mutually insoluble liquids are usually brought into direct contact with each other for any of three principal purposes, namely, transfer of dissolved material or heat from one liquid to the other, or to cause a chemical reaction between the two liquids. The most important of these purposes, and the one with which this invention is primarily concerned, is solvent extraction, i.e., the separation of solution components by causing their unequal distribution between two mutually insoluble liquids. As used herein, the phrase "mutually soluble liquids" means two liquids of such limited solubility in each other that for practical purposes they are considered mutually insoluble. Water and oil or kerosene are examples of two such liquids.

Solvent extraction processes, particularly in the mining industry, typically use multiple stages of mixer-settler units, with an aqueous phase and a water-insoluble organic phase, such as, kerosene, being repeatedly mixed and separated. The two phases flow countercurrently between stages of mixing tanks and settling tanks. One common version of solvent extraction apparatus and process is shown in U.S. Pat. No. 3,206,288. Such prior art equipment has had to be relatively large to be commercially feasible. This invention makes it possible to reduce substantially the size of solvent extraction apparatus, or conversely, to increase substantially the throughput of material being treated without increasing equipment size.

Separation of two immiscible liquids in a gravity settler tank involves many steps of which only two take a significant time. They are the aproach of a droplet toward the interface between the upper and lower layers, the drainage of the film of the continuous phase formed between the droplet and its bulk phase, and eventual rupture of the droplet, resulting in coalescence of the droplet with its bulk phase.

Where the two liquids are of appreciable volume and must be substantially fully separated, as in solvent extraction, the approach of a droplet toward the interface is of relatively minor importance, and coalescence of the droplet into its bulk phase is controlling. For example, in the solvent extraction of dissolved copper from leach liquid using a reagent dissolved in kerosene, the approach of a droplet toward the interface is typically accomplished in no more than about 10% of the flow path through the settler tank. For the remaining 90% of the length of the flow path, a dispersion band of almost uniform thickness is formed consisting of uncoalesced droplets dispersed in a continuous phase of the other liquid.

For any given liquid-liquid solvent extraction system, the settler tank size is established by the flow rate per unit of horizontal area of the settler, which corresponds to the desired dispersion band thickness at the outlet end of the settler tank. Increasing the thickness of the dispersion band increases the coalescence rate, or reduces the required area of the settler tank.

However, the thickness or height of the dispersion band has a practical economic limit. For a given settler depth, a thicker dispersion band means thinner clear liquid layers above and below the band. This causes a greater risk, when removing the clear liquids, of entraining some of the valuable components in the dispersion band material. Alternately, if the settler depth is increased to permit increasing the band thickness, the increased inventory of valuable liquids more than offsets the saving in settler tank area. As a result, practical considerations require that in a settler with a liquid depth of, say, 20 inches, the designed dispersion band thickness should be no more than about 2 inches at normal operations, or about 3 inches in upset or unstable conditions of operation. With this invention, the effective dispersion band thickness is made greater than that which is obtained in conventional equipment, resulting in faster coalescence with a concomitant reduction in equipment size, or increased throughput, or both.

The invention is also useful in removing suspended solids from liquids, such as in the treatment of crushed ores in mining operations. The typical process of mining breaks up excavated material into pieces ranging in size from the largest conveniently handled down to fine dust. Most operations require further crushing of the large material, generating further fine solids or dust.

When leaching is used to treat the crushed ore, the valuable constituent is dissolved out of the ore with a suitable liquid reagent (for example, an aqueous solution of a mineral acid) by adding the liquid to the ore, either as a spray, by percolating through a quiescent mass, or by agitating in a slurry. The valuable solution (called "leach liquor") drawn off contains suspended particles of solids, often further reduced in size and increased in number by the action of the leaching reagent. The quantity and size of these suspended particles are a function of the ore type, degree of crushing and exact measure of the leaching.

The suspended solids typically interfere with further processing of the leach liquor, and the custom has been to try to separate them out in large settling ponds or clarifiers, or to filter the liquor. Either settling or filtering requires large capital expenditures. The required clarification or filtration investment is often reduced by adding flocculents, a class of reagents which coagulates the suspended solids into larger clusters, which settle or filter more readily. The use of flocculents typically adds significantly to operating costs.

Leach liquors are often further processed by solvent extraction. As indicated above, in this process an organic chemical, with the capability of combining with a particular valuable constituent in the leach liquor, is dissolved in a suitable organic liquid, say, kerosene. When thoroughly mixed with the leach liquor, and then separated by gravity, the reagent-kerosene mixture absorbs the desired component from the aqueous leach liquor. The kerosene is then further processed to extract the component in a pure, relatively concentrated form for further operations, such as electrowinning.

The presence of suspended solids in the leach liquor is generally regarded as unacceptable for solvent extraction, not because of any particular difficulty in mixing with the reagent-kerosene mixture, but because the solids, in the subsequent separating stage, tend to accumulate at the interface between the aqueous leach liquor and the kerosene, interfering with coalescence and slowing the rate of separation to a point where normal operations must be suspended while the settler is cleaned. Pre-treatment of the aqueous leach liquor with a coagulant is not feasible because its residue produces an emulsion not separable in the settler tank.

This invention removes the solids in a liquid-liquid gravity settler tank, thereby eliminating the need for flocculants, filtration, or clarification.

SUMMARY OF THE INVENTION

This invention improves the efficiency of separating one liquid from another or suspended solids from a liquid by providing apparatus which includes a settling tank with an inlet for admitting a mixture of a first liquid of one density and a second liquid of a different density. The two liquids are substantially mutually insoluble, and one or both of them may contain suspended solids. On entering the tank, the mixture separates into a clear upper layer of lighter liquid, a clear lower layer of the heavier liquid, and a dispersion band of the mixture at the interface of the two layers. Means are provided for removing liquid from the upper layer and for removing liquid from the lower layer. Impediment means are disposed in the tank in the dispersion band to impede the flow of the mixture in the band away from the inlet means. This causes the thickness of the dispersion band to increase over that which would prevail if the impediment were not present. As explained above, increasing the thickness of the dispersion band results in a higher coalescence rate.

In the preferred form of the invention, the impediment means is a horizontal baffle or pipe disposed below the surface of the upper layer and above the tank bottom. Preferably, the baffle or pipe includes an opening through it, and if solids are to be separated from one or both of the liquids being treated, collecting means are provided for removing the mixture in the dispersion band passing through the opening in the impediment baffle or pipe. To minimize the possibility of plugging the opening, horizontally spaced holes are preferably used, and horizontal lips above and below the holes extend across the tank to insure uniform flow from the entire width of the dispersion band into the collecting means. Preferably, the pressure drop through the opening or openings in the impediment baffle or pipe is substantially greater than the pressure drop through the collecting means so that uniform collection of mixed material from the dispersion band is effected across the entire width of the band. Means are also provided for vertical adjustment and sensing the position of the impediment means in the tank to insure that it is disposed within the dispersion band.

In terms of method, solids are separated from a first liquid in which the solids are suspended by mixing the first liquid and suspended solids with a second liquid which is substantially insoluble in the first liquid and is of a density different from that of the first liquid. The mixture is passed through a settler tank where the mixture separates into a clear upper layer of the lighter liquid, a clear lower layer of the heavier liquid, and a dispersion band of the mixture between the two layers where at least some of the solids collect. At least a portion of the mixture in the dispersion band is removed from the tank to separate the solids collected in the dispersion band from the liquid in which they were suspended.

BRIEF DESCRIPTION OF THE DRAWINGS

FIG. 1 is a partially schematic plan view taken on line 1—1 of FIG. 2 of three mixer-settler units equipped and operated in accordance with the preferred embodiment of this invention and connected in series to provide countercurrent flow of aqueous and organic phases;

FIG. 2 is a view taken on line 2—2 of FIG. 1; and

DESCRIPTION OF THE PREFERRED EMBODIMENTS

Figure 3:
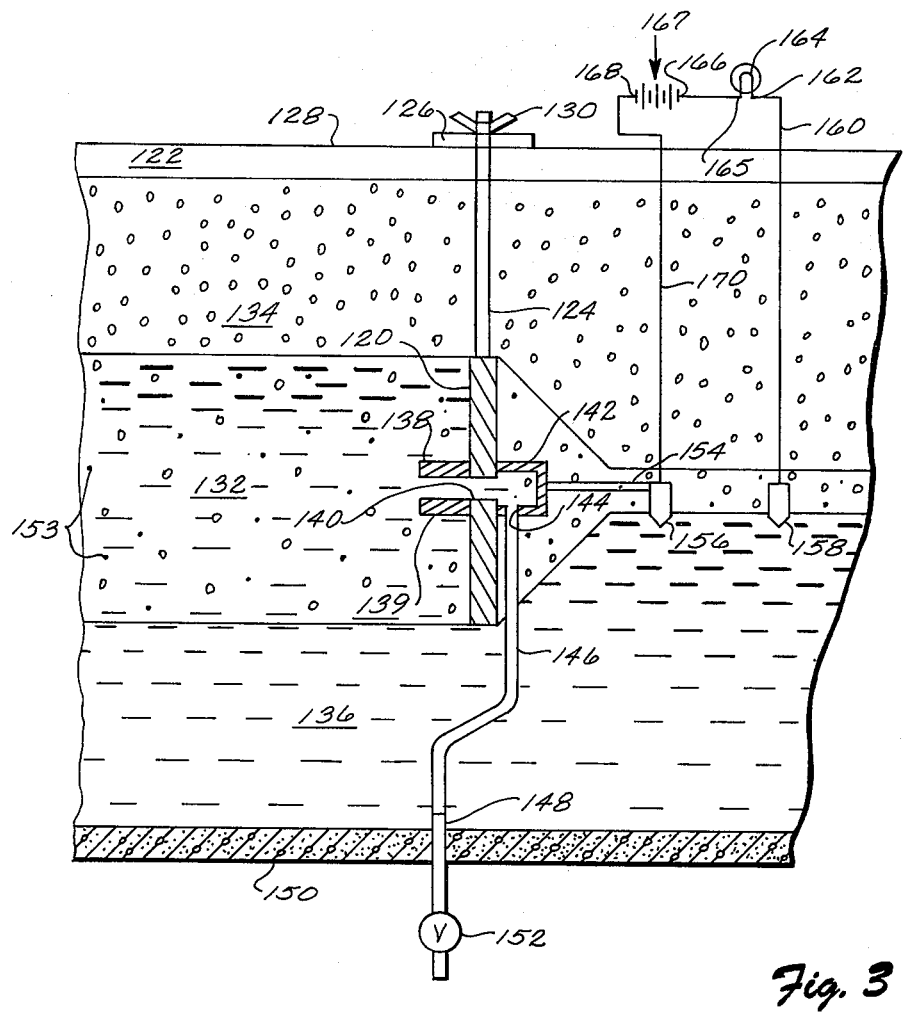
FIG. 3 is a schematic elevation showing means for adjusting and sensing the position of an impediment baffle used in accordance with the invention.

Referring to FIG. 1, first, second and third rectangular mixer-settler units 10A, 10B, and 10C, respectively, from left to right (as viewed in FIG. 1) are disposed side by side, and are connected in series for countercurrent flow of oil and water through them. The units are identical, and for brevity only the middle unit of the three is described in detail.

Each mixer-settler unit includes a horizontal rectangular bottom 12, side walls 14, inlet and outlet end walls 16 and 17, respectively. As shown in FIGS. 1 and 2, the bottom and side walls of each unit are cast integrally of concrete, and the bottom of each unit rests on the ground 18. A sump 20 is formed adjacent the inlet end wall 16 near its midpoint where the wall has a curved portion 22 which is convex facing the outlet end wall 17. A vertical baffle 24 has its lower edge formed integrally with the tank bottom, and is spaced from and parallel to the inlet end wall 16. The central portion of the baffle 24 has a curved section 26 opposing curved section 22 of the end wall 16. Section 26 is curved concave toward the curved section 22 to complete the sump 20. Each end of the baffle 24 terminates short of its respective adjacent side wall 14 to leave a respective exit opening 28 between the end of the baffle and the adjacent side wall.

A simple centrifugal pump impeller 30 is mounted in the central portion of the sump over an inlet opening 32 (FIG. 2) in the bottom of the sump. The impeller is secured to the lower end of a vertical shaft 33, which is turned by suitable conventional means (not shown). The impeller is spaced slightly above the bottom of the tank, and includes downwardly and radially extending blades 34 welded to the underside of a horizontal circular disk 36 secured to the lower end of the shaft. Thus, the disk of the impeller and the bottom of the tank act as a pump casing for the blades. As the impeller is rotated, oil and water are drawn up through a supply line 37 connected to the inlet 32 in the bottom of the sump, mixed, and pumped outwardly from the sump in oppositely extending retention channels 40 formed between the inlet end wall 16 and the baffle 24. Mixed oil and water in the retention channels flow away from the impeller and out the openings 28 at each end of the baffle, and are uniformly distributed across the tank by an elongated vertical distributor wall 42 parallel to and spaced slightly from the baffle so that a distributor channel 44 is formed between the baffle 24 and the distributor wall. Vertical slots 46 are formed at equally spaced intervals along the length of the distributor wall and extend from the bottom to the top of the distributor wall so that mixed oil and water from the distributor channel flows tout through the slots and into a settling tank 48. To improve uniformity of distribution of mixed liquids flowing into the settling section of the tank, a separate vertical impingement picket 50 is disposed downstream from each vertical slot 46 in the distributor wall. Thus, liquid flowing through the slots impinges on the pickets 50 to provide a more uniform distribution along the inlet end of the tank. As shown best in FIG. 2, the height of the side walls, end walls, baffle, distributor wall and upper end of the impingement pickets are all substantially the same.

A vertical, transverse oil-phase launder 52 is formed between a first transverse underflow and overflow weir wall 54, extending across the settling section from one side wall to the other, and a transverse underflow barrier wall 56 extending across the tank from one side wall to the other adjacent the discharge end walls 17. A bottom 58 in the oil-phase launder extends from the lower edge of the rear wall to the lower edge of the barrier wall, and is spaced above the bottom of the tank so that the aqueous or heavier phase can flow under the oil-phase launder. Oil flows over the top edge of the weir wall 54 and into the launder 52. An oil-phase downcomer pipe 60 at the end of the oil-phase launder adjacent the first mixersettler unit removes the oil phase from the settling tank for flow to the sump of the first mixer-settler unit.

Water in the aqueous phase flows under the launder 52 and over a water weir wall 64, which extends from the bottom of the unit up to just below the operating level of the oil layer in the settling tank, and from side wall to side wall of the unit. Thus, an aqueous-phase launder 66 is formed between water weir wall 64 and the outlet end 17 of the tank. A water downcomer pipe 68 at the end of the water launder 66 adjacent the third unit transfers water from the outlet end of the second settling tank to the sump of the third mixer-settler unit.

In operation, oil from a downcomer pipe 60 in the third mixer-settler, and water from a downcomer pipe 68 in the first mixer-settler, enter the inlet 32 of the sump in the second mixer-settler. The impeller imparts a centrifugal pumping action and effects a relatively gentle mixing of the oil and water to form an unstable or temporary emulsion of oil in water, or vice versa, depending on the system being treated and the manner in which the equipment is operated. The unstable emulsion of oil and water flows from the sump, through the retention channel, and into the distributor channel. The flow rate of the mixed liquids, and the total horizontal area of the sump and retention channel is such that "flooding" takes place, i.e., there is no substantial separation of the emulsion in either the sump or the retention channel.

the mixed liquids flow from the distributor channel through the vertical slots in the distributor wall, impinge the pickets, and then flow across the settler tank where under the force of gravity and the interfacial tension between the two faces, the mixture is continuously settled and coalesced to form a clear upper layer 72 of the oil or lighter liquid, and a clear lower layer 73 of the aqueous or heavier phase.

A first vertical impediment baffle 80 is spaced downstream from the pickets and extends perpendicularly to the side walls entirely across the settler tank. As shown best in FIG. 2, the upper edge of the first impediment baffle is spaced below the surface of the upper layer of liquid, and is located at the interface of the upper layer of liquid and a dispersion band 82 of a mixture of unseparated oil and water between the upper and lower layers of clear oil and clear water. The lower edge of the first impediment baffle is spaced above the bottom of the settler tank at the interface between the dispersion band and the clear lower layer of water. A horizontal slit 84 extends through the center of the baffle to let a restricted amount of mixed oil and water in the dispersion band pass through. Uncoalesced oil and water also cascade over and under the upper and lower edges of the first impediment baffle. since the density of the mixture is between that of the upper and lower layer, the mixture passing the first impediment baffle flows into the dispersion band, where further separation of the oil and water occurs.

The first impediment baffle is supported in place by a separate vertical threaded rod 88 secured at its lower end to a respective end of the baffle. The upper end of the suspension rod passes up through an opening (not shown) in a separate respective bracket 90 secured to a respective side wall of the settler tank. A wing nut 92 on the upper end of the threaded rod is used to adjust the height of the first impediment baffle to be in the center of the dispersion band.

A second impediment baffle 94 of less height than the first baffle is secured across the settler tank downstream from the first impediment baffle exactly as just described. The upper and lower edges of the second impediment baffle are at the respective interfaces between the dispersion band and the upper and lower clear layers. A series of horizontally spaced holes 96 extend through the horizontal center line of the baffle to permit some of the uncoalesced mixture of oil and water in the second section of the dispersion band to pass through. Additional uncoalesced material flows over and under the upper and lower edges, respectively, of the second impediment baffle into a dispersion band beyond the baffle. A horizontal collector pipe 100 extends perpendicularly to the side walls across the settler tank downstream from the second impediment baffle. The outside diameter of the pipe is less than the height of the second impediment baffle, and lies in the upper and lower limits of the dispersion band. The pipe is supported in the center of the dispersion band by vertical threaded rods 88, wing nuts 92, and brackets 90, from the side walls of the settler tank as just described for the first and second impediment baffles.

A series of horizontal holes 102 are formed through the portion of the pipe wall nearest the second impediment baffle. The holes are horizontally spaced along the horizontal plane passing through the longitudinal center line of the pipe. Upper and lower horizontal lips 104 and 106, respectively, are secured to the outer wall of the pipe just above and below the horizontal row of holes 102, and extend the full length of the pipe. A vertical outlet hole 108 in the bottom of the pipe is connected by a flexible hose 110 to an outlet conduit 112 which extends down through the bottom of the settler tank. A valve 114 in conduit 112 controls the rate of liquid flow leaving the pipe. Thus, a portion of the uncoalesced mixture of oil and water in the dispersion band at the collector pipe can be withdrawn from the tank. That portion of the mixture in the dispersion band not withdrawn from the tank flows over and under the pipe to form a final section 116 of the dispersion band, which terminates against the vertical weir wall 54 in the settler tank.

If the impediment baffles and the collector pipe were not positioned in the settler tank as shown and described in FIGS. 1 and 2, the dispersion band would be of substantially the same thickness throughout most of its travel in the settler tank. In the conventional settler tank, the mixture of uncoalesced oil and water enters the settler tank and cascades down and up towards the center line of the dispersion band, and then it spreads out through the dispersion band. As the dispersed material travels through the band, its flow rate is reduced by coalescence, reducing the velocity of the dispersed material proportionately to a point where the velocity is zero at the outlet end of the settler tank, i.e., against the weir wall 54. However, at the inlet end of the tank, the velocity of the dispersion band, which is relatively thick, and quickly narrows to almost its final thickness, is about 10 times that for the overall flow of total liquid through the settler tank. In a typical conventional liquid-liquid settler tank, the thickness of the dispersion band decreases rapidly to almost its final thickness within the first about 10% of the total flow path of the dispersion band through the tank. Thus, there is a substantial difference in liquid velocity between the upper and lower layers in the dispersion band. This causes turbulent and "reverse" flow in the clear upper and lower layers.

If the impediment baffles and pipe shown in FIGS. 1 and 2 were not present, the dispersion band throughout almost the entire length of the tank would be approximately equal to the thickness of that portion of the dispersion band shown between the collector pipe and the overflow weir wall 54. The use of the impediment baffles and collector pipe in accordance with this invention prevents the uncoalesced mixture of oil and water from flowing so rapidly through the dispersion band area of the settler tank, and maintains an artificially thick dispersion band so that coalescence is accelerated. This also reduces the horizontal flow rate of uncoalesced mixed oil and water in the dispersion band area, thereby equalizing the flow rate between the material in the dispersion band and the upper and lower clear layers. This reduces the turbulence in the clear layers and facilitates efficient separation.

As shown best in FIG. 2, that portion of the dispersion band between the inlet end of the settler tank and the first impediment baffle starts out with a thickness approximately equal to the total liquid depth in the tank. The thickness of the bank decreases quickly to that established by the upper and lower edges of the first impediment baffle. In the section of the dispersion band between the first and second impediment baffles, the band narrows rapidly to the thickness established by the upper and lower edges of the second impediment baffle. Liquid cascading over and under the second impediment baffle quickly reduces to the thickness of the dispersion band established by the upper and lower edges of the collector pipe. Thereafter, the thickness of the dispersion band is established by the rate at which uncoalesced material flows past the collector pipe. This is controlled so that the thickness of the dispersion band between the collector pipe and the weir wall 54 is normally between about 5% and about 20% of the total liquid depth in the settler tank.

In those operations where a substantial amount of solids may be suspended in one of the liquids, usually the heavier or aqueous phase, the suspended solids tend to concentrate in the dispersion band. Withdrawal of material through the collector pipe removes that mixture which contains the highest concentration of dispersed solids with the removal of a relatively small amount of the total aqueous phase being processed. This is a substantial advantage over the prior art processes which used clarification or filtration treatment before the aqueous phase entered the settler tank. For example, conventional clarifiers require roughly 10 sq. ft. per gallon per minute of aqueous phase processed. On the other hand, a kerosene-water settler tank requires only 1 to 1.5 sq. ft. per gallon per minute of aqueous phase processed. The fluid removed from the collector pipe is only a small fraction of the volume of the aqueous phase, ranging from no more than about 5% of the total flow if draw-off is continuous, down to 0.1% if intermittent draw-off is used. Thus, for every thousand gallons of leach liquor processed, only one gallon or so need be removed intermittently through the collector pipe to separate the solids from the liquid, which may be recycled back to a mixing sump.

For such small flows, highly effective methods of separation, such as, heating, centrifuging, etc., can be used if desired because they are economical and well proven. On the other hand, application of such methods to the entire volume of leach liquid treated would be prohibitively expensive.

The detailed design of the interfacial draw-off of liquid containing suspended solids can take any desired form as long as the following main objectives are met:

1. The hydraulic flow should be such that the draw-off removes liquid essentially only from the interface between the upper and lower clear layers, i.e., liquid only from the dispersion band;

2. The draw-off removes liquid essentially evenly across the full width of the settler; and 3. Means are provided for locating the draw-off to be sure it is in the center of the dispersion band of interface between the upper and lower clear layers.

The collector pipe just described with respect to FIGS. 1 and 2 can be used to achieve all of the above three objectives. The draw-off rate through the collector pipe is controlled so that the fluid velocity entering the lips on the collector pipe is the same as, or less than, the velocity of the main flow in the settler tank. This assures that only interfacial fluid is withdrawn. Moreover, the sizing and spacing of the holes (or slots if desired) is such that the fluid pressure drop through them is large compared with the hydraulic losses in the rest of the draw-off system. This insures that the draw-off flow is essentially uniform across the width of the settler.

FIG. 3 shows schematically in detail how impediment means (whether a baffle or pipe) can be accurately located in the dispersion band between the oil and water layers to remove interfacial fluid.

Referring to FIG. 3, a vertical impediment baffle 120 extends across a settler tank 122 as previously described. The baffle is supported in the desired location by a vertical threaded rod 124 secured at its lower end to the upper edge of the impediment baffle. The upper portion of the rod is threaded and extends through a bracket 126 mounted on the upper edge 128 of a side wall of the settler tank. A wing nut 130 adjusts the position of the rod and that of the impediment baffle in the settler tank so that the horizontal center line of the baffle is in the center of a dispersion band 132 between an upper clear layer 134 of an oil phase and a lower clear layer 136 of an aqueous phase. Upper and lower horizontal lips 138 and 139, respectively, extend horizontally upstream and extend across the tank at the upper and lower edges, respectively, of a horizontal slot 140 extending through the baffle and for substantially the entire length of the baffle. A collector chamber 142 is secured to the back side of the baffle over the slot 140. A discharge opening 144 in the bottom of the collector chamber is connected by flexible hose 146 to a discharge conduit 148 extending down through a bottom 150 of the settler tank. A control valve 152 in the conduit 148 regulates the amount of liquid and suspended solids 153 withdrawn from the dispersion band. A horizontal rod 154 is secured at its upstream end to the rear face of the collector chamber 142. A first adjustable downwardly extending electrode 156 is secured to the downstream end of the horizontal rod, and extends down through the dispersion band on the downstream side of the baffle to just make contact with the aqueous phase in the settler tank. A second fixed electrode 158 is suspended by an insulated electrical conductor 160 connected to one terminal 162 of an electric light 164. A second terminal 165 of the light is connected to a first terminal 166 of a battery 167. The other terminal 168 of the battery is connected by a flexible insulated electric conductor 170 to the adjustable electrode, which moves up and down with the baffle as its position is adjusted by the wing nut on the upper end of the vertical rod supporting the baffle. Thus, to position the baffle as shown in FIG. 3, the wing nut is turned to lower the baffle until the first adjustable electrode just makes contact with the aqueous phase, which is an electrolyte. This permits current to flow through the electric light. To conserve power, the wing nut is then adjusted to raise the baffle until the movable electrode is just out of the aqueous phase so that the electric light turns off, if the oil phase is continuous in the dispersion band. If desired, the movable electrode can be left in continuous contact with the aqueous phase. However, this wastes power, and is not necessary. If the water phase is the continuous phase in the dispersion band, the position of the movable electrode with respect to the slot in the baffle is changed so that when the baffle is centered in the dispersion band, the movable electrode is just above the dispersion band, causing the electric light to turn off.

From time to time, the wing nut can be turned just sufficiently to cause the electric light to turn on, and then be reversed to extinguish the light to be sure that the slot in the impediment baffle remains centered in the dispersion band between the upper and lower layers of clear liquid.

From the foregoing description, it is clear that applying this invention to the cleaning of leach liquor for processing by solvent extraction eliminates the need for one or more separate pre-treatment stages of organic scrubbing followed by settling because these functions are performed when the interfacial solids are drawn-off in the solvent extraction equipment itself. The interfacial draw-off can be added to conventional solvent extraction settlers at negligible cost, resulting in improved coalescence rate because of impediment to flow of uncoalesced liquid in the dispersion band, and in easy removal of solids which collect at the interface and would otherwise interfere with efficient separator operation.

I claim:

1. Apparatus for separating a mixture of a first liquid of one density and a second liquid of a different density and which is substantially insoluble in the first, the apparatus comprising a settling tank, inlet means for admitting the mixture into the tank where the mixture separates into an upper layer of a lighter liquid, a lower layer of the heavier liquid, and a dispersion band of the mixture at the interface of the two layers, first outlet means in the tank and horizontally spaced from the inlet means for removing liquid from the upper layer, second outlet means in the tank and horizontally spaced from the inlet means in the same direction as the first outlet means for removing liquid from the lower layer, and elongated impediment means disposed in the tank in the dispersion band to impede the flow of the mixture in the band away from the inlet means, the impediment means being spaced horizontally from the two outlet means in a direction toward the inlet means and extending transverse to the direction of flow from the inlet means to the two outlet means, the impediment means having an upper edge spaced below the top surface of the upper layer of liquid to permit unimpeded flow of the liquid in the upper layer toward the two outlet means, and having a lower edge spaced above the tank bottom to permit unimpeded flow of the liquid in the lower layer toward the two outlet means.

2. Apparatus according to claim 1 in which the impediment means extends substantially entirely across the settling tank.

3. Apparatus according to claim 2 which includes a horizontal slit extending through the impediment means and for substantially the entire length of the impediment means.

4. Apparatus according to claim 2 which includes a series of longitudinally spaced holes extending through the impediment means.

5. Apparatus according to claim 1 which includes means for vertically adjusting the position of the impediment means.

6. Apparatus according to claim 5 which includes means for sensing the vertical position of the impediment means.

7. Apparatus according to claim 6 which includes means for sensing the vertical position of the impediment means with respect to the interface between the two layers of liquid.

8. Apparatus according to claim 1 which includes an opening extending through the impediment means so that liquid in the dispersion band can flow through the impediment means.

9. Apparatus according to claim 1 which includes means for collecting liquid in the dispersion band and for removing the collected liquid from the tank.

10. Apparatus according to claim 1 in which the impediment means is a vertical baffle.

11. Apparatus according to claim 10 in which the vertical baffle has a horizontal slit extending through it and for substantially the entire length of the baffle.

12. Apparatus according to claim 10 in which the vertical baffle has a series of horizontally spaced holes extending through it.

13. Apparatus according to claim 1 in which the impediment means is an elongated conduit having longitudinally spaced holes through one wall of the conduit on the upstream side, and means for removing liquid which collects in the conduit.

14. Apparatus according to claim 13 which includes a pair of elongated horizontal lips secured to the pipe above and below the holes and extending away from the pipe in an upstream direction.

15. Apparatus according to claim 1 which includes a plurality of impediment means disposed in the tank and the dispersion band, the impediment means being spaced from each other in the direction of liquid flow through the tank.

16. Apparatus according to claim 15 in which the impediment means are of decreasing height in the direction of flow through the tank.

17. Apparatus according to claim 16 in which the respective upper edges of the impediment means in the direction of the liquid flow through the tank are progressively lower.

18. Apparatus according to claim 17 in which the respective lower edges of the impediment means in the direction of the liquid flow through the tank are progressively higher.

19. Apparatus according to claim 15 in which each of the impediment means has openings extending through them to permit the flow of liquid in the dispersion band to pass through said impediment means.

* * * * *